July 5, 1949.　　　J. M. STRANG ET AL　　　2,475,528
OBSERVER'S SEAT FOR USE WITH RANGEFINDERS,
HEIGHTFINDERS AND OTHER OPTICAL
OBSERVATION INSTRUMENTS
Filed July 16, 1946　　　　　　　　　4 Sheets-Sheet 4
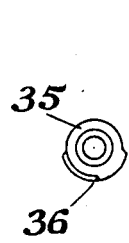
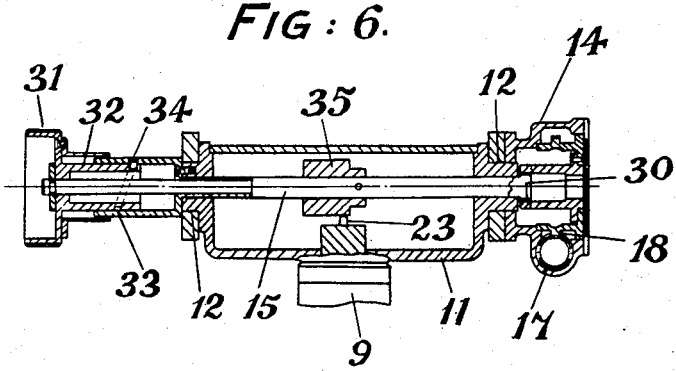
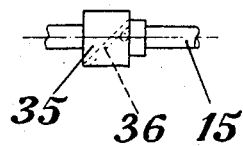

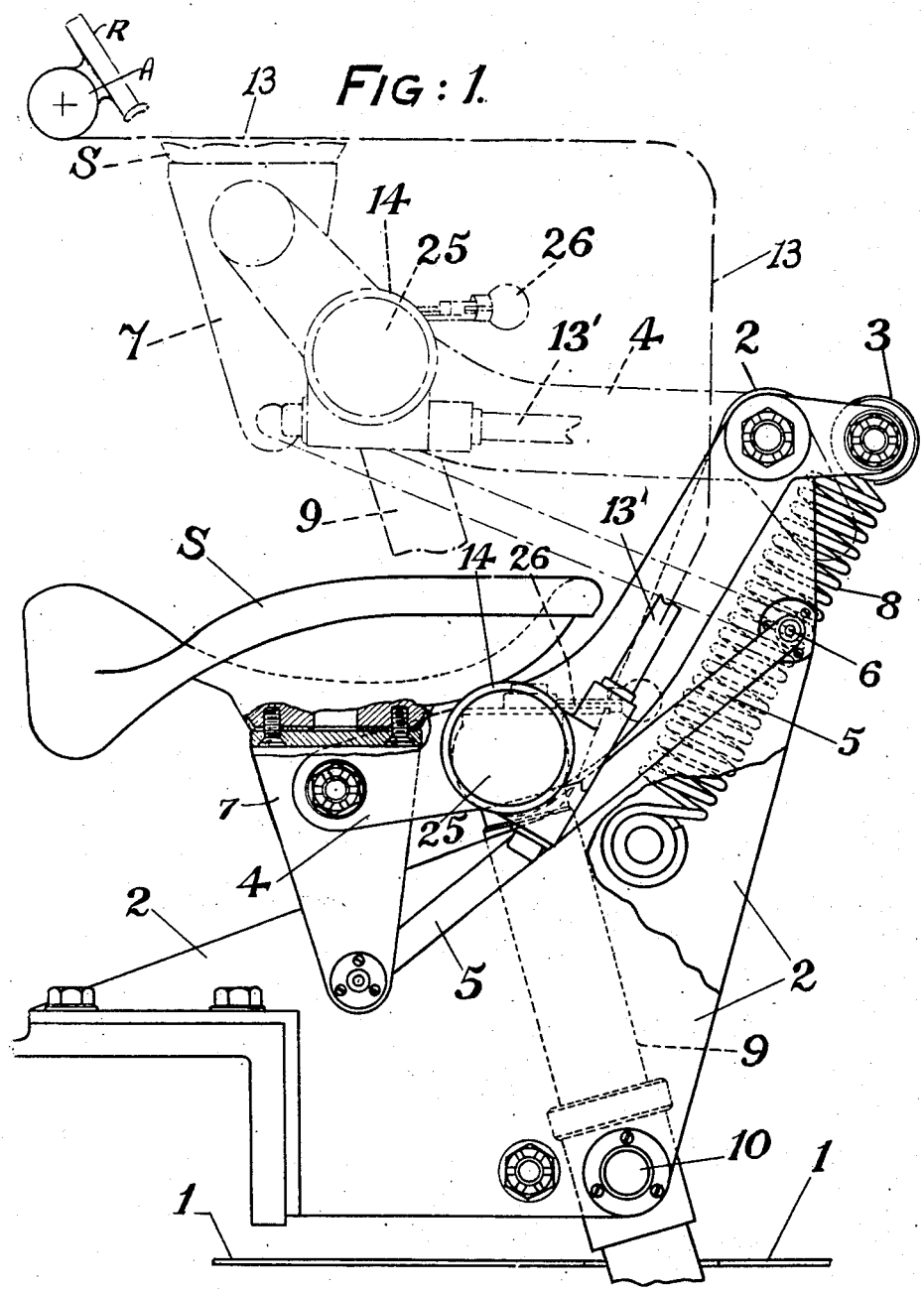

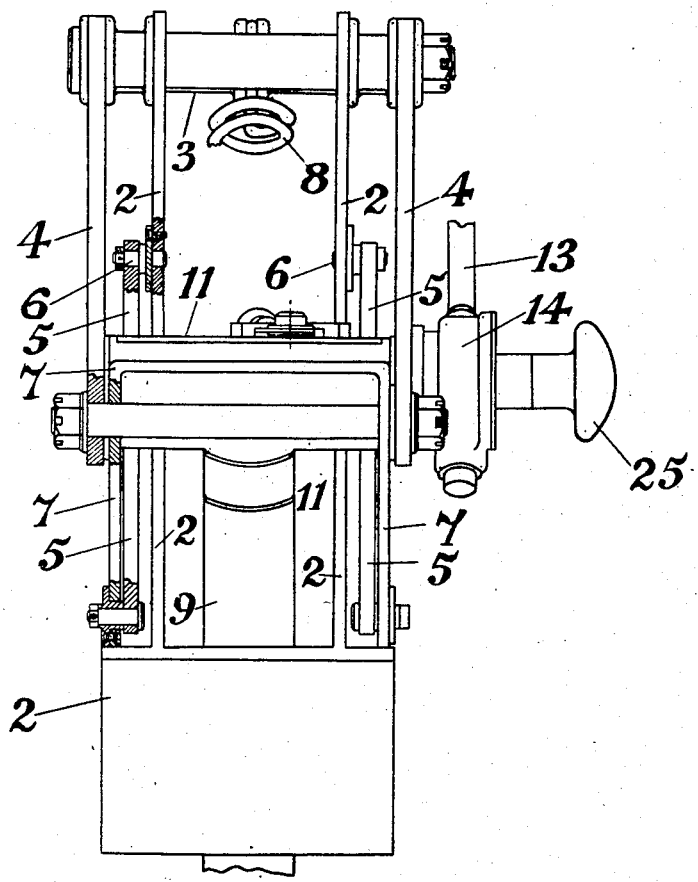
FIG: 2.

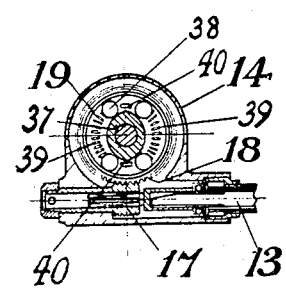
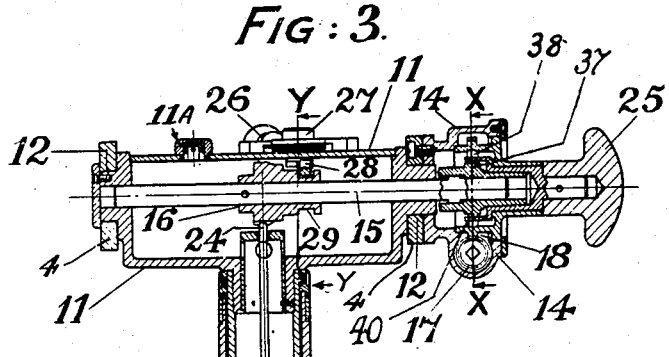
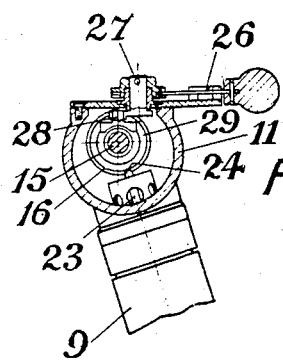
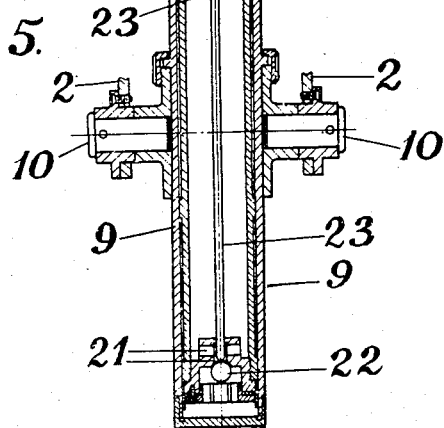

Patented July 5, 1949

2,475,528

UNITED STATES PATENT OFFICE 2,475,528

OBSERVER'S SEAT FOR USE WITH RANGE FINDERS, HEIGHT FINDERS, AND OTHER OPTICAL OBSERVATION INSTRUMENTS

John Martin Strang and Claud Foster, Glasgow, Scotland, assignors to Barr & Stroud, Limited, Glasgow, Scotland Application July 16, 1946, Serial No. 684,048
In Great Britain November 23, 1943

Section 1, Public Law 690, August 8, 1946
Patent expires November 23, 1963

10 Claims. (Cl. 88—1)

1

This invention refers to rangefinders, height-finders and other optical observation instruments, and it is concerned with conditions where the instrument is carried on a mounting relative to which it is movable angularly about a normally horizontal axis of fixed height in order to vary the elevation of the line of sight of the instrument, this movement involving corresponding angular movement of the eyepiece (or eyepieces) of the instrument about that axis.

An example of an instrument operating under these conditions is a rangefinder carried on a mounting on board ship with the base casing of the rangefinder normally horizontal and movable about its own longitudinal axis for variation of the elevation of the line of sight, the eyepiece being on the outside of the base casing and moving angularly with it. For convenience, the invention will be described in its application to a rangefinder so mounted.

If the observer using the eyepiece (who will be referred to in the description as the rangetaker) is provided with a seat fixed in height, he is subject to a good deal of discomfort owing to the variation in height of the eyepiece as the elevation of the line of sight changes. Seats variable in height by hand driven mechanism or by power mechanism have been proposed, but with the former the rangetaker frequently cannot conveniently spare a hand for operating the seat, and for the latter, power may not be readily available and the mechanism constitutes a substantial complication.

In observing with the rangefinder on aircraft targets, the most general condition is that the aircraft is rapidly approaching, thus demanding rapid increase in the elevation of the line of sight, and, in providing a movable seat for the rangetaker, this is the condition that requires primarily to be dealt with.

According to this invention, a rangetaker's seat for use with a rangefinder mounted as specified is characterised by the seat being movable downwards under the rangetaker's weight subject to control by, and in accordance with, the movement of the rangefinder as the latter is turned to increase the elevation of the line of sight, the movement of the seat being thus effected without the use of external power.

To effect the return or upward movement of the seat, the seat may be made movable downwards against yielding means, for example, a spring arrangement, and be movable upwards under the action of the yielding means when relieved of the rangetaker's weight.

2

In carrying the invention into practice, the seat and the weight upon it may be supported by a piston or equivalent acting on a confined volume of liquid, the downward movement of the seat being provided for by the regulated release of liquid from the pressure side of the piston as a result of the movement of the rangefinder in elevation.

Thus the release of liquid may be controlled by a valve actuated from the rangefinder and which, when the yielding means are operating to return the seat, remains open and allows the liquid to return to the pressure side of the piston.

The valve may be opened by displacement of a cam, which displacement is annulled or wiped out as a result of the downward movement of the seat, thus allowing the valve to close and hold the seat at a height corresponding with the elevational position of the rangefinder.

Hand-operated means may be provided for directly adjusting the height of the seat in the downward direction, i. e. independently of elevational movement of the rangefinder.

The invention will now be described by way of example with reference to the accompanying drawings, in which:

Figure 1 is a side view, partly in section, showing the seat and its supporting mechanism, Figure 2 is a corresponding view from the front, the rangetaker, when seated, facing to the left in Figure 1, Figure 3 is a sectional view from the front, Figures 4 and 5 are sectional views on the planes X—X and Y—Y respectively of Figure 3, Figure 6 is a sectional view showing details of a modification, and Figures 7 and 8 illustrate an element of Figure 6.

Referring to Figures 1 to 5, the rangefinder R coupled with its elevating mechanism A (which is indicated diagrammatically and in miniature) and the rangetaker's seat are carried by a turntable mounting, of which the floor f is shown in Figure 1. For the support of the seat, two brackets 2 are secured to the turntable and extend upwards. Two parallel levers 4 are pivoted on the brackets 2 and two parallel radius rods 5 are pivoted at 6 on the brackets 2. These levers 4 and the radius rods 5 are pivotally connected at their other ends to a seat base 7 upon which the seat S is fixed. A coil spring 8 is anchored at its lower end to the brackets 2 and secured at its upper end to a cross-piece 3 between the right hand ends of the levers 4, Figure 1. The action of the spring is to urge the seat upwards, the seat and its supports being shown in full lines in Figure 1 at the position of minimum height.

Underneath the seat there is an oil cylinder 9 which is mounted in trunnions 10 in the brackets 2. At its upper end the cylinder is rigidly connected to a transverse oil reservoir 11, see particularly Figure 3, which oil reservoir is journalled at its ends 12 in the links 4. At the right hand end, Figure 3, there is a gear box 14 which is fixed to the right hand link 4. From the rangefinder elevating mechanism A, a flexible shaft 13 leads to the gear box 14. In Fig. 1, the flexible shaft 13 is shown diagrammatically and is surrounded by a fragmentarily shown cover 13'.

Referring more particularly to Figures 3, 4 and 5, which show the interior of the gear box and oil reservoir, a spindle 15 extends through the oil reservoir 11 from end to end and carries a cam 16 which is fixed on the spindle 15. The flexible shaft 13 drives a worm 17 which drives a worm wheel 18 concentric with the spindle 15. Drive is transmitted from the worm wheel 18 to the spindle 15 through an autolock free-wheel 19, see Figure 4.

Within the cylinder 9 there is a hollow piston 20, see Figure 3. At the bottom or pressure end of the piston 20 there is an oil passageway 21 provided with a ball valve 22 co-operating with a tappet rod 23 which extends upwards through a guide at the upper end of the piston into the reservoir 11, where it is acted on by the cam 16.

An air escape port is incorporated in the filler cap 11A, as shown in Fig. 3.

Assuming the seat to be in its position of maximum height as shown in dotted lines in Figure 1, and that the rangetaker is sitting on the seat, the pressure of oil on the under side of the piston 20 closes the valve 22 and the seat is sustained by the oil, it being also assumed that a notch 24 in the cam 16, see Figure 5, is registering with the upper end of the tappet rod 23. If the rangefinder elevating mechanism A is operated so as to increase the elevation of the line of sight of the rangefinder R, rotational movement is transmitted through the flexible shaft 13 to the worm 17, worm wheel 18, autolock 19, and the spindle 15. This turns the cam 16 so that the notch 24 moves a corresponding distance out of register with the tappet rod 23. The rod 23 is depressed and opens the valve 22, thus releasing oil through the passage 21 to the upper side of the pressure end of the piston and to the reservoir 11. The seat S therefore sinks under the rangetaker's weight. It will be seen that as the seat moves downward, angular movement of the reservoir 11 takes place relative to the links 4 and therefore relative to the gear box 14. The cam 16 turns, as a result of this movement, relative to the tappet rod 23 in a direction which tends to wipe out the displacement of the cam due to the elevating mechanism A, so that, when the seat S has moved a definite amount corresponding with the elevation of the rangefinder R, the notch 24 is brought back into register with the tappet rod 23, allowing the valve 22 to close and holding the seat S in the desired position. The seat is thus held at a position corresponding with the elevation of the rangefinder R and remains in that position until further elevational movement is applied to the rangefinder R when further lowering of the seat S takes place. There is thus a height position of the seat S corresponding with each elevational position of the rangefinder R.

If the rangetaker wishes to elevate the seat, he takes his weight off the seat whereupon the spring 8 turns the links 4 and radius rods 5 clockwise in Figure 1. The valve 22 leaves its seat and allows the passage of oil from above to below the piston. The seat will rise as far as the rangetaker allows it up to maximum height.

A head 25, through the medium of the autolock, provides for hand-operation of the cam 16 independently of the drive from the elevating gear of the rangefinder and thus provides for hand-control of the movement of the seat and for initial setting of the cam. The autolock 19 comprises an elliptical piece 37 which turns with the shaft 15, four balls 38 between this elliptical piece 37 and the inside of the worm wheel 18, springs 39, and two projections 40 provided on a sleeve attached to the head 25. These projections 40 extend between the balls 38 and also engage with slots (not shown) in the elliptical piece 37. Rotation of the worm wheel 18 in either direction causes two of the balls 38 to jam on the elliptical piece 37, thereby rotating the shaft 15 together with the head 25. By turning the head 25 manually the balls can be pushed and held free of the jamming position, so interrupting the drive. Farther rotation of the head 25 by hand causes the projections 40 to take up the clearance in the slots of the elliptical piece 37 and thus turns the shaft 15. Rotation of the head 25 in either direction thus enables the shaft 15 to be advanced or retarded relative to the worm wheel 18, and, as the valve operating cam 16 is attached to the shaft 15, initial adjustment can be given to the seat position.

Mechanism is provided, see Figures 3 and 5, for rendering inoperative the control of the seat from the rangefinder. This mechanism comprises a lever 26 pivoted about a vertical axis 27 on the reservoir 11 and a finger 28 moving with the lever 26 and engaging with a groove 29 in the cam body. When the lever is moved to its "out" position, the cam 16 and spindle 15 are slid endwise, Figure 3, so that the cam becomes inoperative, there being a key and keyway connection in the gear box 14 which permit of this sliding movement. The valve 22 is then closed and the seat fixed in position.

Figures 6, 7 and 8 show a modification of the hand-control mechanism. In this case, drive from the worm wheel 18 is transmitted to the spindle 15 through a key and keyway arrangement 30, the spindle 15 being slidable lengthwise. For sliding the spindle 15 it has a head 31 fixed on it, and the head 31 has a tubular extension 32 with a helical groove 33 in it. This groove is engaged by a stationary stud 34 so that, on rotation of the head 31, it and the spindle 15 move axially, displacing the cam 35 with them. The cam 35 is shown in Figures 7 and 8. The rise of the cam, marked 36, is oblique. The cam can be displaced axially far enough to render it inoperative relative to the tappet rod 23.

We claim:

1. In combination an optical observation instrument which is movable angularly about a normally horizontal axis to vary the elevation of the line of sight, an observer's adjustable seat, control mechanism actuated by movement of the optical observation instrument, a fixed supporting structure, a lever arrangement pivoted on said supporting structure, and to said seat so that the height of said seat is varied by angular movement of said lever arrangement relative to said structure, a liquid chamber pivotally mounted on said structure to contain a quantity of liquid, a piston telescopically arranged in said chamber and supported by said liquid, said piston being pivotally connected with said lever arrangement so as to support same and the seat against downward movement, a reservoir in communication with said chamber, a valve controlling release of liquid from said chamber to said reservoir to allow the lever arrangement and seat to sink under the observer's weight, valve actuating mechanism operated by actuation of said control mechanism in one direction to open said valve and operated by the angular movement of said lever arrangement to close said valve and bring the seat to rest at a height corresponding with the amount of movement of the control mechanism, and yielding means for raising the saddle part when relieved of the observer's weight and refilling the liquid chamber.

2. In combination, an optical observation instrument which is movable angularly about a normally horizontal axis to vary the elevation of the line of sight, an observer's adjustable seat, control mechanism actuated by movement of the optical observation instrument, a fixed supporting structure, a lever arrangement pivoted on said supporting structure and to said seat so that the height of said seat is varied by angular movement of said lever arrangement relative to said structure, a liquid chamber pivotally mounted on said structure to contain a quantity of liquid, a piston telescopically arranged in said chamber and supported by said liquid, said piston being pivotally connected with said lever arrangement so as to support same and the seat against downward movement, a reservoir in communication with said chamber a valve controlling release of liquid from said chamber to said reservoir to allow the lever arrangement and seat to sink under the observer's weight, valve actuating mechanism operated by movement of said control mechanism and including a one-way device to be operated by said control mechanism only in the direction for lowering said seat, said valve actuating mechanism including a rotary cam device, for controlling said valve and movable by said one-way device to open said valve, mechanism operated by the sinking of said lever arrangement to move the valve angularly relative to said cam device and close the valve and bring the seat to rest at a height corresponding with the amount of movement of the control mechanism, and yielding means for raising the saddle part when relieved of the observer's weight and refilling the liquid chamber.

3. In combination, an optical observation instrument which is movable angularly about a normally horizontal axis to vary the elevation of the line of sight, an observer's adjustable seat, control mechanism actuated by movement of the optical observation instrument, a fixed supporting structure, a lever arrangement pivoted on said supporting structure and to said seat so that the height of said seat is varied by angular movement of said lever arrangement relative to said structure, a liquid chamber pivotally mounted on said structure to contain a quantity of liquid, a piston telescopically arranged in said chamber and supported by said liquid, said piston being pivotally connected with said lever arrangement so as to support same and the seat against downward movement, a reservoir in communication with said chamber a valve controlling release of liquid from said chamber to said reservoir to allow the lever arrangement and seat to sink under the observer's weight, valve actuating mechanism operated by movement of said control mechanism and including a one-way device to be operated by said control mechanism only in the direction for lowering said seat, said valve actuating mechanism including a rotary cam device, for controlling said valve and movable by said one-way device to open said valve, mechanism operated by the sinking of said lever arrangement to move the valve angularly relative to said cam device and close the valve and bring the seat to rest at a height corresponding with the amount of movement of the control mechanism, a spring acting on the lever arrangement for raising the seat when relieved of the observer's weight and refilling the liquid chamber, and a finger-operable head by movement of which said one-way driving device can be rendered inoperative and the cam device turned relative to said driving device to provide for initial adjustment of the cam device relative to the drive.

4. In combination an optical observation instrument which is movable angularly about a normally substantially horizontal axis to elevate or lower the line of sight of the instrument, a height adjustable seat for an observer using such instrument, adjustable supporting means for said seat including a hydraulic cylinder and piston means for supporting said seat, valve means for said cylinder and piston means which when open allows said seat to lower under the force merely of the observer's weight, valve operating means for operating said valve control means interconnecting said valve operating means and said instrument which automatically opens said valve means when the instrument is elevated and which closes said valve means for limiting the lowering of said seat in accordance with the amount of elevation of the instrument, and means storing energy when the seat is lowered under the observer's weight and which, when the observer's weight is removed, automatically raises the seat independently of lowering of the instrument.

5. In combination, an optical observation instrument having an elevating mechanism for adjusting the elevation of the line of sight of said instrument, a seat for an observer using the instrument, means supporting said seat and including a hydraulic cylinder with a piston connected to said seat, yielding means resiliently biasing said seat upwardly, a reservoir in communication with said cylinder, a valve controlling the flow of liquid between said cylinder and reservoir to vary the elevation of said piston and seat under the observer's weight and in opposition to said yielding means, valve actuating mechanism controlling the operation of said valve, and drive means between said valve actuating mechanism and said instrument elevating mechanism for operating said valve to effect the adjustment of said seat in accordance with the adjustment of said instrument.

6. In combination, an optical observation instrument having an elevating mechanism for adjusting the elevation of the line of sight of said instrument, a seat for an observer using the instrument, means supporting said seat and including a hydraulic cylinder with a piston connected to said seat, yielding means resiliently biasing said seat upwardly, a reservoir in communication with said cylinder, a valve controlling the flow of liquid between said cylinder and reservoir to vary the elevation of said piston and seat under the observer's weight and in opposition to said yielding means, valve actuating mechanism controlling the operation of said valve, drive means between said valve actuating mechanism and said instrument elevating mechanism for operating said valve to effect the adjustment of said seat in accordance with the adjustment of said instrument, and manually operable means for disconnecting said drive means and operating said valve actuating mechanism to initially adjust said seat relative to said instrument.

7. In combination, an optical observation instrument having an elevating mechanism for adjusting the elevation of the line of sight of said instrument, a seat for an observer using the instrument, means supporting said seat and including a hydraulic cylinder with a piston connected to said seat, yielding means resiliently biasing said seat upwardly, a reservoir above said piston and in communication with said cylinder by an opening through said piston, a check valve in said piston opening and controlling the flow of liquid between said cylinder and reservoir to vary the elevation of said piston and seat under the observer's weight and in opposition to said yielding means, valve actuating mechanism including a tappet rod for unsealing said valve to permit fluid to flow from said cylinder to said reservoir, and drive means between said valve actuating mechanism and said instrument elevating mechanism for operating said valve to effect the adjustment of said seat in accordance with the adjustment of said instrument.

8. In combination, an optical observation instrument having an elevating mechanism for adjusting the elevation of the line of sight of said instrument, a seat for an observer using the instrument, means supporting said seat and including a pivotally mounted hydraulic cylinder with a piston pivotally connected to said seat, yielding means resiliently biasing said seat upwardly, a reservoir in communication with said cylinder, a valve controlling the flow of liquid between said cylinder and reservoir to vary the elevation of said piston and seat under the observer's weight and in opposition to said yielding means, valve actuating mechanism controlling the operation of said valve and pivotal about the axis of the pivotal connection between said piston and seat for valve operating adjustment and a flexible shaft between said valve actuating mechanism and said instrument elevating mechanism for adjusting said actuating mechanism to operate said valve and effect the adjustment of said seat in accordance with the adjustment of said instrument.

9. In combination, an optical observation instrument having an elevating mechanism for adjusting the elevation of the line of sight of said instrument, a seat for an observer using the instrument, means supporting said seat and including a support, lever pivoted on said support and pivotally connected to said seat a hydraulic cylinder pivoted on said support and having a piston pivotally connected to said seat, yielding means resiliently biasing said seat upwardly, a reservoir in communication with said cylinder, a valve controlling the flow of liquid between said cylinder and reservoir to vary the elevation of said piston and seat under the observer's weight and in opposition to said yielding means, valve actuating mechanism pivotally adjustable about the axis of the pivotal connection of said piston and seat for controlling the operation of said valve, and drive means between said valve actuating mechanism and said instrument elevating mechanism for operating said valve to effect the adjustment of said seat in accordance with the adjustment of said instrument.

10. In combination, an optical observation instrument having an elevating mechanism for adjusting the elevation of the line of sight of said instrument, a seat for an observer using the instrument, means supporting said seat and including a support, levers pivoted on said support and pivotally connected to said seat, a hydraulic cylinder pivoted on said support and having a piston pivotally connected to said levers, yielding means connected to said levers and resiliently biasing said seat upwardly, a reservoir in communication with said cylinder, a valve controlling the flow of liquid between said cylinder and reservoir to vary the elevation of said piston and seat under the observer's weight and in opposition to said yielding means, valve actuating mechanism pivotally adjustable about the axis of the pivotal connection of said piston and seat for controlling the operation of said valve, and drive means between said valve actuating mechanism and said instrument elevating mechanism of the observation instrument for operating said valve to effect the adjustment of said seat in accordance with the adjustment of said instrument.

J. MARTIN STRANG.
CLAUD FOSTER.

REFERENCES CITED

The following references are of record in the file of this patent:

UNITED STATES PATENTS

| Number | Name | Date |
| --- | --- | --- |
| 2,218,963 | Stephenson | Oct. 22, 1940 |
| 2,334,922 | Gustafson | Nov. 23, 1943 |
| 2,335,286 | Klemperer et al. | Nov. 30, 1943 |
| 2,400,812 | Corte | May 21, 1946 |

FOREIGN PATENTS

| Number | Country | Date |
| --- | --- | --- |
| 662,794 | France | Mar. 25, 1929 |
| 541,990 | Great Britain | Dec. 22, 1941 |